United States Patent
Yang

(10) Patent No.: US 9,933,586 B1
(45) Date of Patent: Apr. 3, 2018

(54) OPTICAL FIBER ADAPTER WITH SHUTTER MEMBERS

(71) Applicant: Muh-Chyng Yang, Kaohsiung (TW)

(72) Inventor: Muh-Chyng Yang, Kaohsiung (TW)

( * ) Notice: Subject to any disclaimer, the term of this patent is extended or adjusted under 35 U.S.C. 154(b) by 0 days.

(21) Appl. No.: 15/612,278

(22) Filed: Jun. 2, 2017

(30) Foreign Application Priority Data

Feb. 23, 2017   (TW) .............................. 106106165 A

(51) Int. Cl.
  *G02B 6/42*   (2006.01)
  *G02B 6/38*   (2006.01)

(52) U.S. Cl.
  CPC ......... *G02B 6/4296* (2013.01); *G02B 6/3825* (2013.01); *G02B 6/3826* (2013.01); *G02B 2006/4297* (2013.01)

(58) Field of Classification Search
  CPC .................................................. G02B 6/3825
  See application file for complete search history.

(56) References Cited

U.S. PATENT DOCUMENTS

| 6,688,780 B2 * | 2/2004 | Duran | .................. G02B 6/3825 385/76 |
| 9,279,940 B2 * | 3/2016 | Mamiya | ................. G02B 6/243 |

| 2012/0251050 A1 * | 10/2012 | Lin | ...................... G02B 6/3825 385/53 |
| 2016/0062051 A1 | 3/2016 | Taira et al. | |

FOREIGN PATENT DOCUMENTS

TW   200933227 A   8/2009

* cited by examiner

*Primary Examiner* — Omar R Rojas
(74) *Attorney, Agent, or Firm* — Rosenberg, Klein & Lee

(57) ABSTRACT

An optical fiber adapter according to the present disclosure includes a main body, a first shutter member, a second shutter member and an inner housing. The first shutter member includes a first base portion, a first shutter plate, a first supporting portion and a first connecting portion. The second shutter member includes a second base portion, a second shutter plate, a second supporting portion and a second connecting portion. The first base portion is positioned on the first wall of the main body. The first connecting portion connects the first base portion. The first supporting portion extends from the first connecting portion. The first shutter plate connects the first supporting portion and extends toward the third wall of the main body. The second base portion is positioned on the third wall of the main body. The second connecting portion connects the second base portion. The second supporting portion extends from the second connecting portion. The second shutter plate connects the second supporting portion and extends toward the first wall of the main body. The inner housing is positioned within the main body through the first opening.

15 Claims, 20 Drawing Sheets

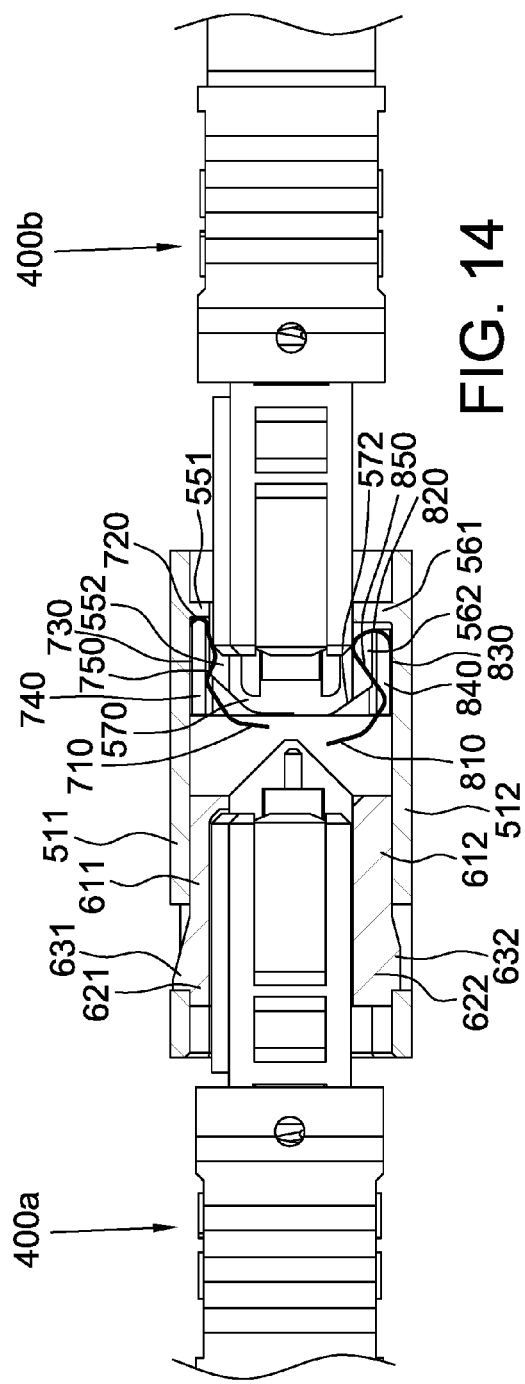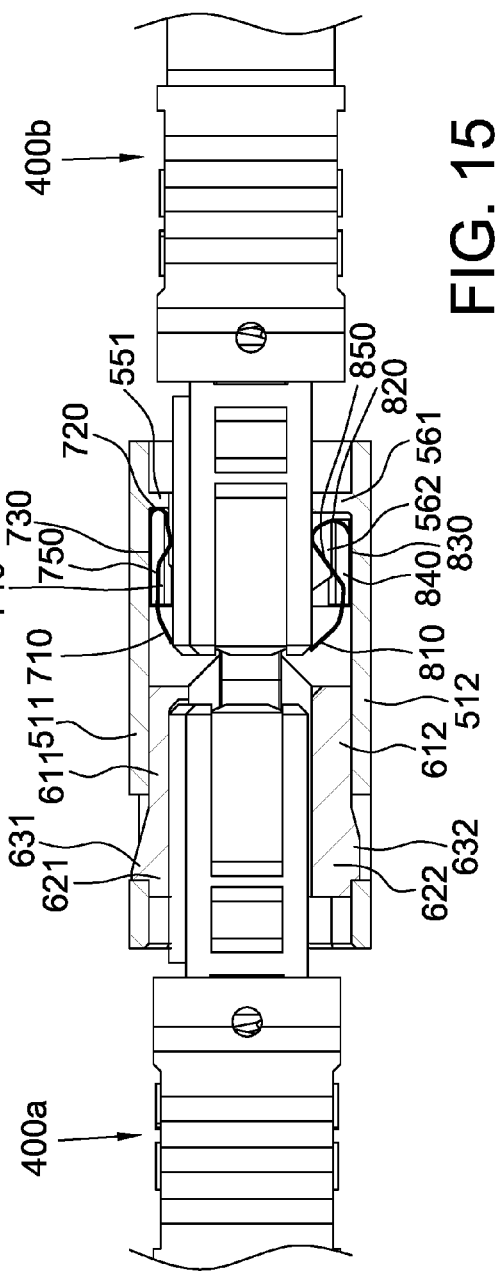

OPTICAL FIBER ADAPTER WITH SHUTTER MEMBERS

RELATED APPLICATION

The present application is based on and claims priority to Taiwanese Application Number 106106165, filed Feb. 23, 2017, the disclosure of which is hereby incorporated by reference herein in its entirety.

BACKGROUND

1 Technical Field

The disclosure relates to an optical fiber adapter, and more particularly, to an optical fiber adapter with shutter members.

2. Description of the Related Art

Recently, the optical fiber has been widely used as signal transmission media because of its high bandwidth and low loss nature. In order to transmit over a longer distance without the need of repeaters, it is common to use a high power diode laser to launch a laser beam into the optical fiber. However, the high power laser beam used to carry information is usually invisible. In other words, the human eyes will be unable to sense the high power laser beam if it leaves from the open end of a fiber cable. Thus, it is required to obstruct the high power laser beam to avoid hurting the eyes when the laser beam leaves from an optical fiber.

Referring to FIG. 1, a conventional optical fiber adapter 100 includes a housing 110 having a plurality of side walls 160. The side walls 160 define a receiving recess 120. One of the side walls 160 is provided with a slot 130 for mating with the key 192 of an optical fiber connector 190 when the connector 190 is inserted into the receiving recess 120. In addition, the outer surfaces of two opposite side walls 160 are provided with recesses 140 that a clip (not shown in the figure) may be disposed thereon to facilitate the adapter 100 to be mounted on a panel.

In general, the adapter 100 further has another set of side walls 160 that defines another receiving recess 120. The two receiving recesses 120 are opposite and may respectively receive a connector 190. Of course, the two receiving recesses 120 of the adapter 100 may be designed to mate with two different types of connectors. The connector 190 is always attached to one end of an optical fiber cable 194 and a light beam may propagate down the optical fiber cable 194 and emit from the ferrule 196 of the connector 190. Likewise, a light beam may be coupled into the optical fiber cable 194 from the end face of the ferrule 196.

When the adapter 100 is used to couple two connectors 190 together, the two connectors 190 are respectively inserted into the receiving recesses 120. The ferrules 196 of the connectors 190 thus slide into a hollow sleeve (not shown in the figure) and are brought into axial alignment and contact with each other. A light beam will be able to propagate from the optical fiber cable 194 of a connector 190 through the interface between the two ferrules 196 and then reach the optical fiber cable 194 of the other connector 190, and vice versa.

When one connector 190 is disconnected from the adapter 100, the light beam originally propagating from the connector 190 still kept in the adapter 100 to the presently disconnected connector 190 will now leave the ferrule 196 and emit from the receiving recess 120. If the emitting light beam is high power and not obstructed, a lasting exposure to such light beam is harmful to people, particularly to the eyes. Thus, to avoid exposing to the high-power light beam, it is common to use a cap 180 to block up the unused receiving recess 120. This may obstruct the light beam and also prevent the receiving recess 120 from dust. If a connector 190 would like to be mated with the adapter 100, the cap 180 is required to be removed. However, the cap 180 is apt to get lost and it is still possible to expose the eyes to the light beam during mating.

Referring to FIG. 2, a conventional optical fiber adapter 200 is generally the same as the adapter 100 but further includes a cover 250 pivotally connected to the housing 110. The cover 250 covers the receiving recess 120 in its closed position. A spring 260 may force the cover 250 to be pivoted to its closed position when the receiving recess 120 is not mated with a connector 190. Thus, the cover 250 is capable of obstructing the light beam emitting from the receiving recess 120 in its closed position. If a user would like to mate a connector 190 with the adapter 200, he is first required to lift the cover 250 from its closed position and then to insert the connector 190 into the receiving recess 120. Upon pulling out the connector 190, the cover 250 is pivoted to cover the receiving recess 120 through the spring 260. As a result, the user has no chance to expose to the high-power light beam. However, the construction of the adapter 200 is much more complex than that of the adapter 100.

Referring to FIG. 3, a conventional protection cap 300 for the optical fiber adapter 100 includes a hollow housing 310 with two opposing openings and a cover 350 pivotally connected to the housing 310. The cover 350 is pivoted to cover one of the two openings through a spring 360. The protection cap 300 may be put on the adapter 100 and cover the outer surfaces of the side walls 160 and the receiving recess 120 of the adapter 100. When a user would like to mate a connector 190 with the adapter 200, he is required to lift the cover 350 from its closed position and then to insert the connector 190 into the receiving recess 120. Likewise, upon pulling out the connector 190, the cover 350 is pivoted to cover the receiving recess 120 by the spring 360. As a result, the user has no chance to expose to the high-power light beam emitting from the receiving recess 120. However, the structure of the protection cap 300 is somewhat complex and therefore it is not inexpensive. The introduction of the protection cap 300 to obstruct the light beam will cost much.

Accordingly, there exists a need to provide a solution to solve the aforesaid problems.

SUMMARY

The present disclosure provides an optical fiber adapter with shutter members that may obstruct the light beams emitting from the accommodation room thereby preventing the eyes from exposure to the light beams. In addition, the optical fiber adapter may also be capable of preventing dust.

In one embodiment, the optical fiber adapter of the present disclosure includes a main body, a first shutter member, a second shutter member and an inner housing. The main body has an accommodation room defined by a first wall, a second wall, a third wall and a fourth wall, wherein the first wall faces the third wall and connects with the second and fourth walls. The accommodation room has opposing first and second openings in an axial direction, wherein the second opening is configured to allow a first optical fiber connector to insert into the accommodation room. The first shutter member is elastic and integrally formed with metal. The first shutter member may be placed within the accommodation room of the main body through the first opening. The first shutter member includes a first base portion, a first supporting portion, a first connecting portion and a first shutter plate. The first base portion is positioned on the first wall. The first connecting portion connects the first base portion with the first supporting portion. The first shutter plate extends from the first supporting portion toward the third wall, wherein the first supporting portion is configured to drive the first shutter plate to move. The second shutter member is elastic and integrally formed with metal. The second shutter member may be placed within the accommodation room of the main body through the first opening. The second shutter member includes a second base portion, a second supporting portion, a second connecting portion and a second shutter plate. The second base portion is positioned on the third wall. The second connecting portion connects the second base portion with the second supporting portion. The second shutter plate extends from the second supporting portion toward the first wall, wherein the second supporting portion is configured to drive the second shutter plate to move. The inner housing is positioned within the accommodation room of the main body through the first opening. The inner housing has an accommodation room defined by a fifth wall, a sixth wall, a seventh wall and an eighth wall, wherein the fifth wall faces the seventh wall and connects with the sixth and eighth walls. The accommodation room of the inner housing has opposing third and fourth openings in the axial direction, wherein the third opening is configured to allow a second optical fiber connector to insert into the accommodation room of the inner housing. The insertion of the first optical fiber connector from the second opening causes the first and second shutter plates to swing toward the first and third walls respectively.

The foregoing, as well as additional objects, features and advantages of the disclosure will be more readily apparent from the following detailed description, which proceeds with reference to the accompanying drawings.

BRIEF DESCRIPTION OF THE DRAWINGS

FIG. 6e is a cross-sectional view taken along line A-A of FIG. 6a.

FIG. 6f is a cross-sectional view taken along line B-B of FIG. 6a.

FIG. 8d is a cross-sectional view taken along line C-C of FIG. 8a.

FIG. 8e is a cross-sectional view taken along line D-D of FIG. 8a.

FIG. 9e is a cross-sectional view taken along line E-E of FIG. 9a.

FIG. 9f is a cross-sectional view taken along line F-F of FIG. 9a.

FIGS. 14 to 15 illustrate how to use the optical fiber adapter of the present disclosure to couple two optical fiber connectors together.

DETAILED DESCRIPTION OF THE PREFERRED EMBODIMENT

Figure 1:
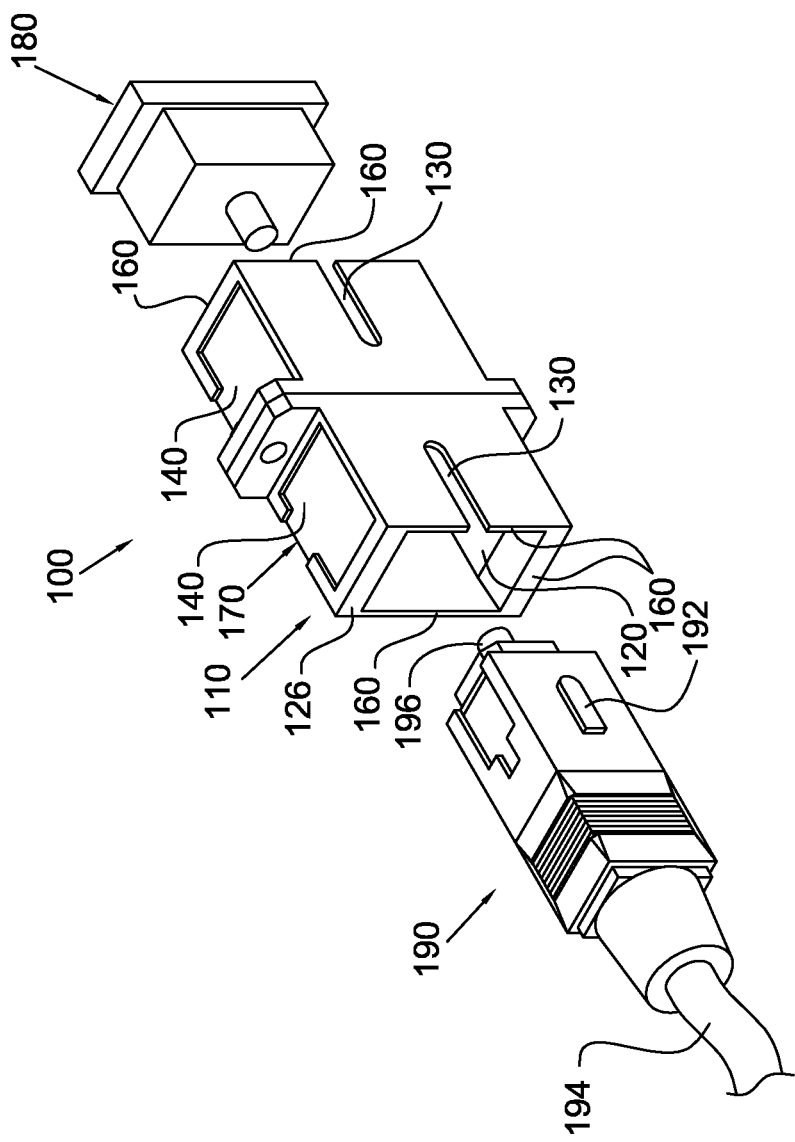
FIG. 1 is an elevated perspective view illustrating a conventional optical fiber adapter and a conventional optical fiber connector.
Figure 2:
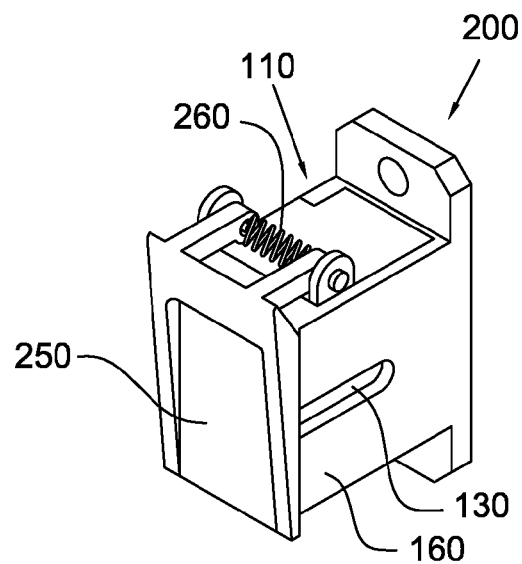
FIG. 2 is an elevated perspective view of a conventional optical fiber adapter with a cover for obstructing the light beams emitting from the receiving recess.
Figure 3:
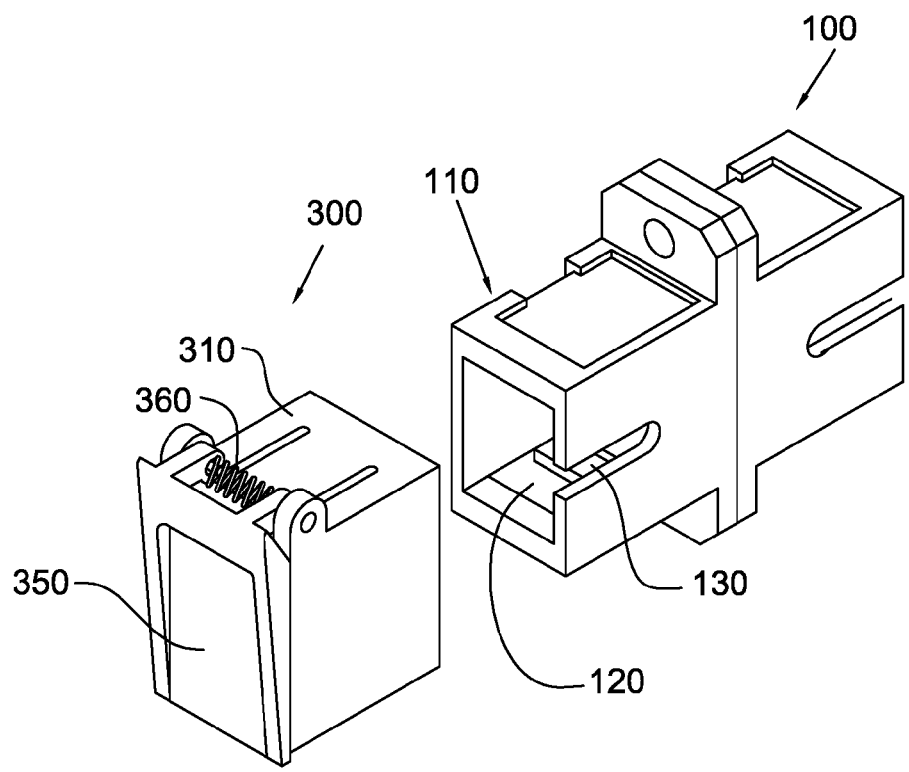
FIG. 3 is an elevated perspective view of a conventional protection cap for an optical fiber adapter.
Figure 4A:
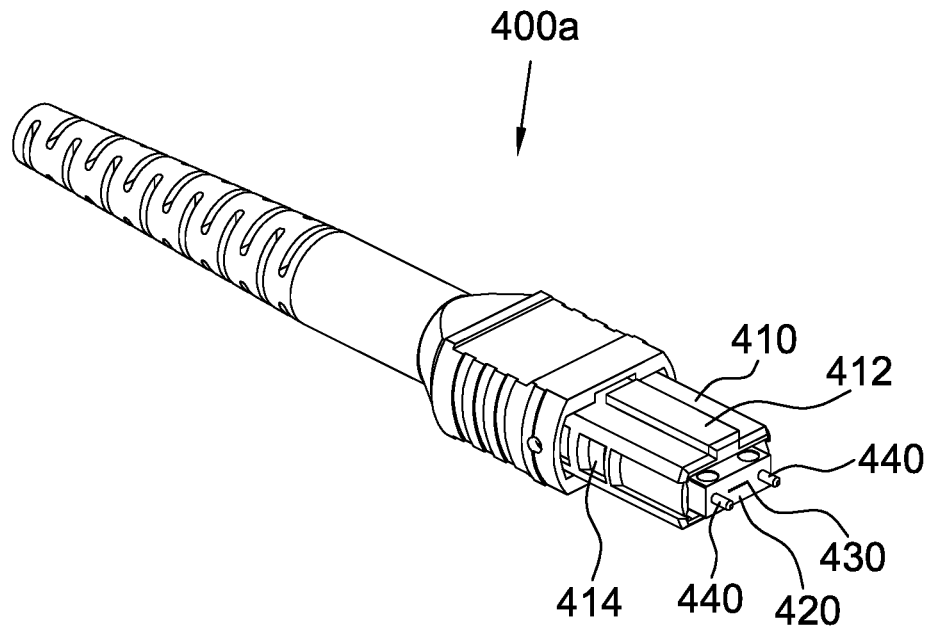
FIG. 4a is an elevated perspective view of a conventional MPO male type optical fiber connector.
Figure 4B:
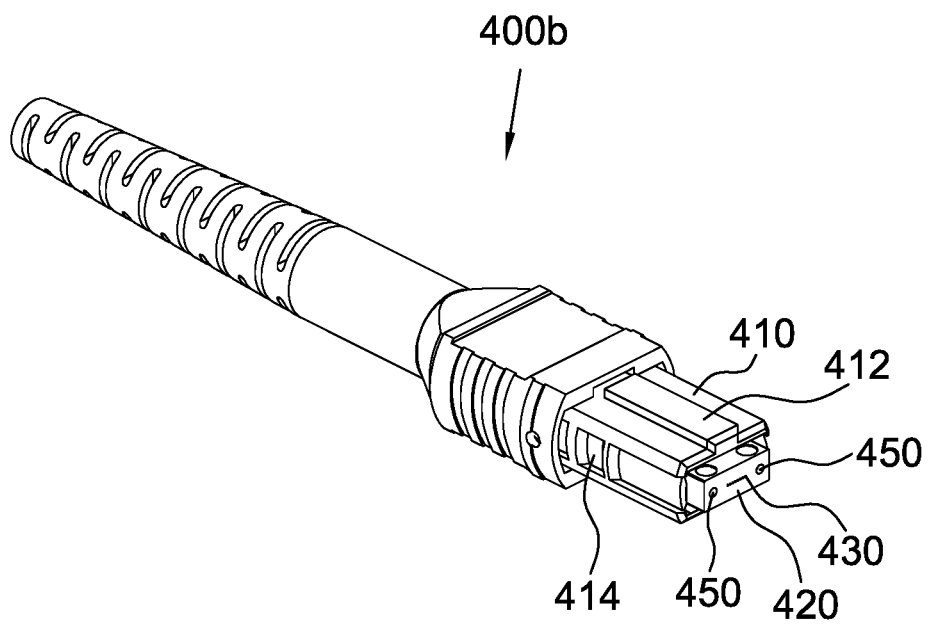
FIG. 4b is an elevated perspective view of a conventional MPO female type optical fiber connector.

Reference is made to FIGS. 4a and 4b, which respectively illustrate conventional multi-fiber MPO male and female type optical fiber connectors 400a and 400b. The respective optical fiber connectors 400a and 400b have a rectangular key projection 412 formed on the upper surface of the front section thereof. Located on two opposing lateral surfaces of the front section are two recesses 414. A plurality of optical fibers 430 is exposed from and coplanar with the front end surface 420 of the front section. Two guide pins 440 protrude from the end surface 420 of the optical fiber connector 400a while two guide holes 450 are formed within the end surface 420 of the optical fiber connector 400b to respectively receive the guide pins 440 of the connector 400a.

Figure 5:
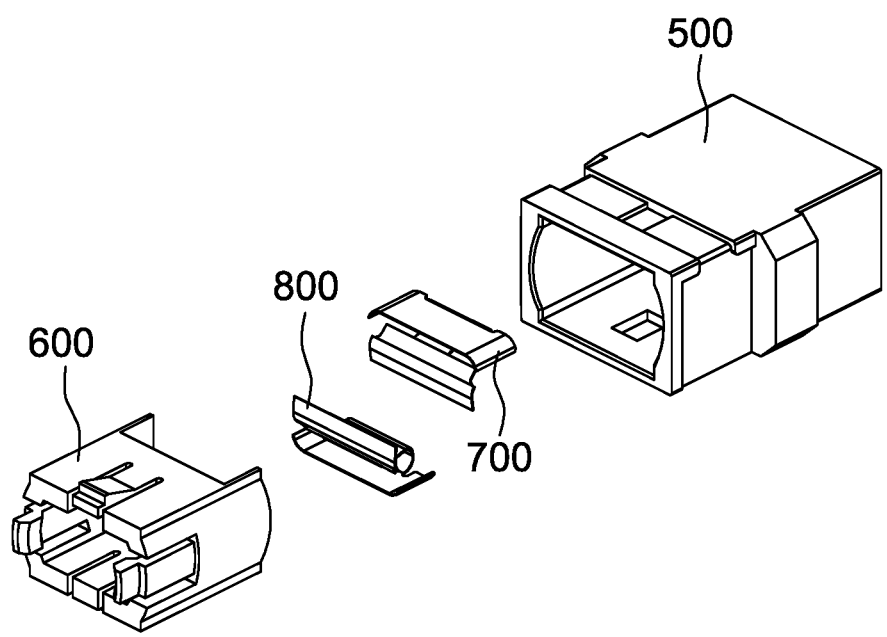
FIG. 5 is an exploded view of the optical fiber adapter of the present disclosure.
Figure 6A:
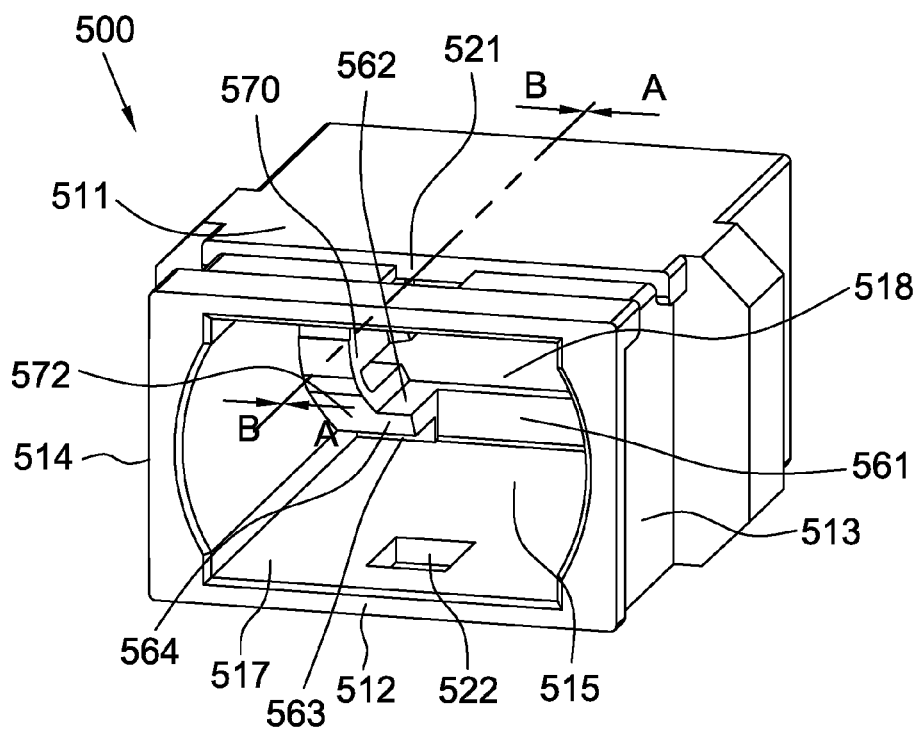
FIGS. 6a to 6d are different elevated perspective views of the main body of the optical fiber adapter of the present disclosure.
Figure 6B:
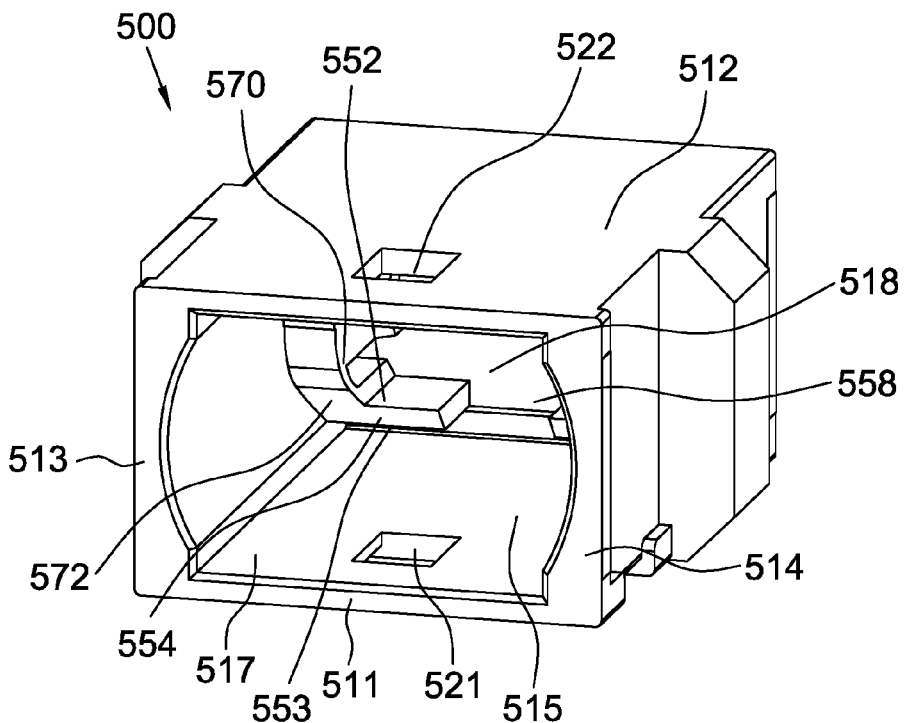
Figure 6C:
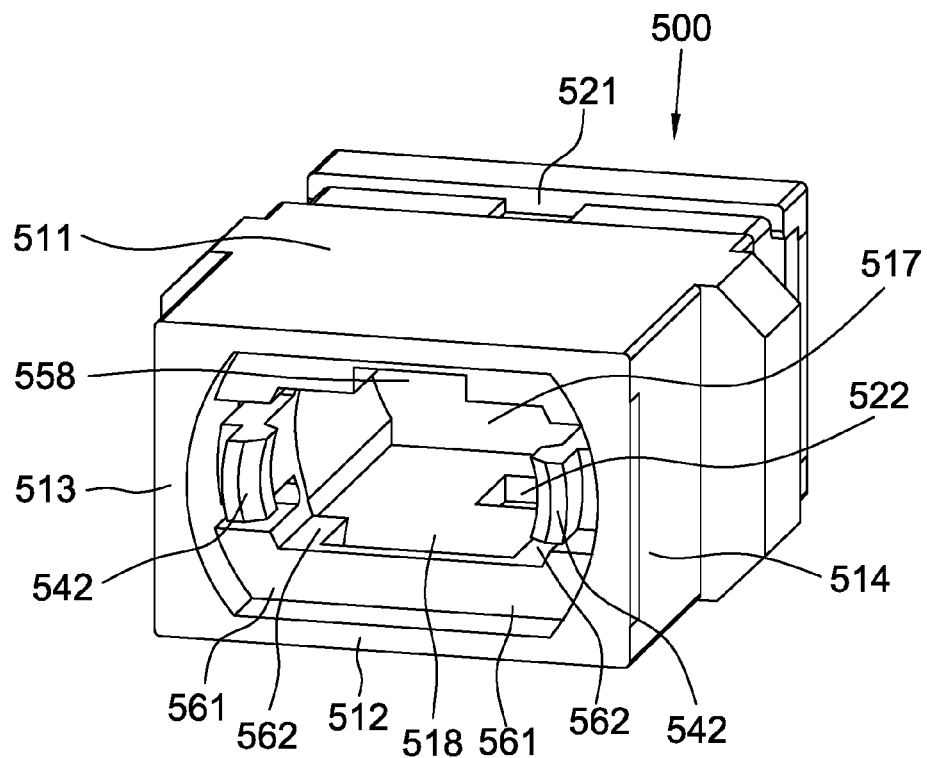
Figure 6D:
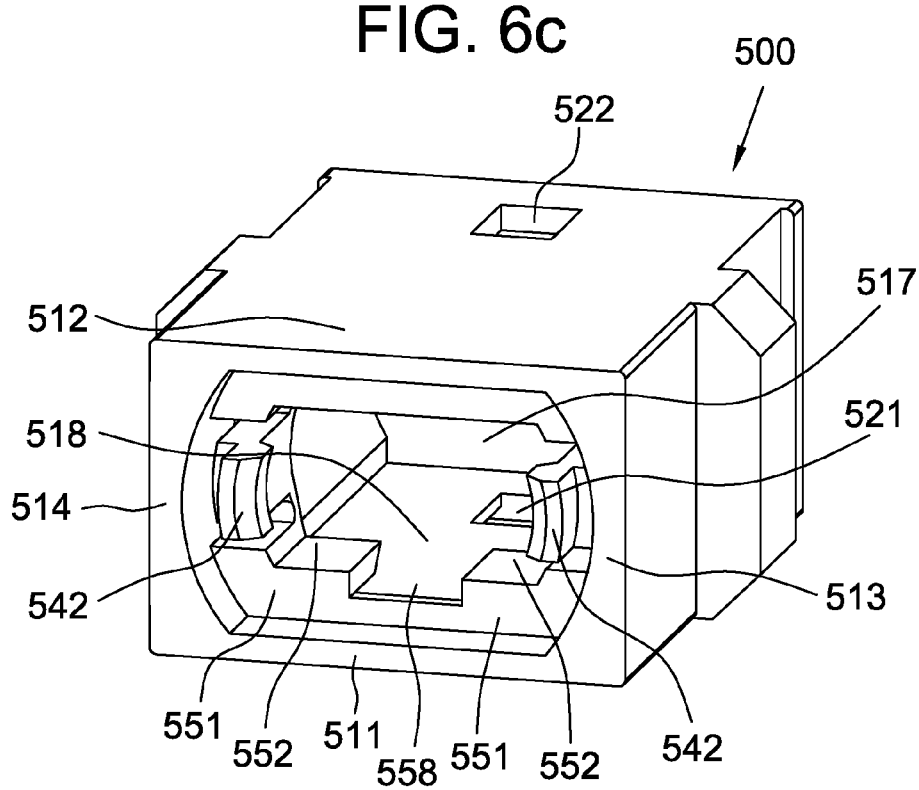
Figure 6E:
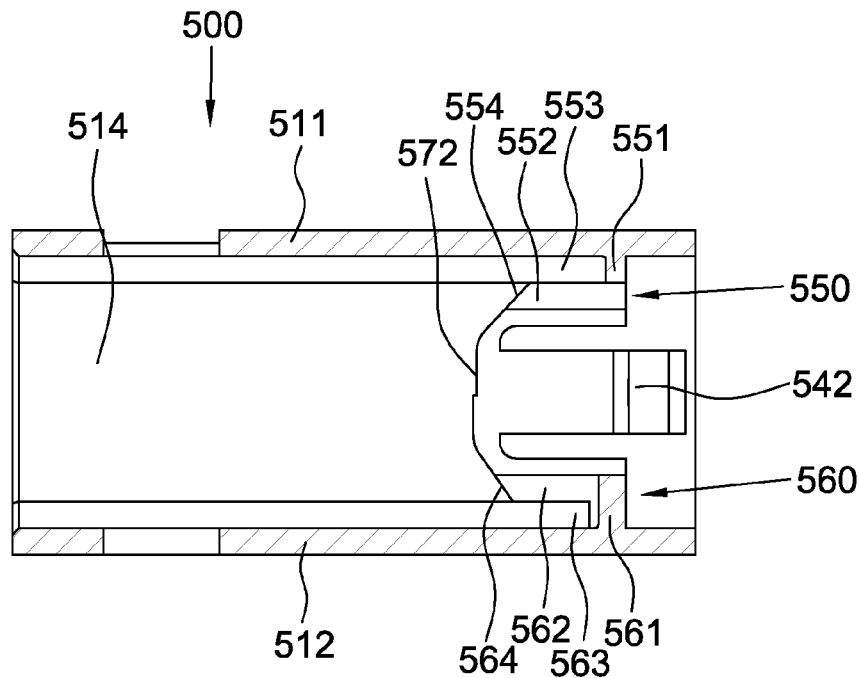
Figure 6F:
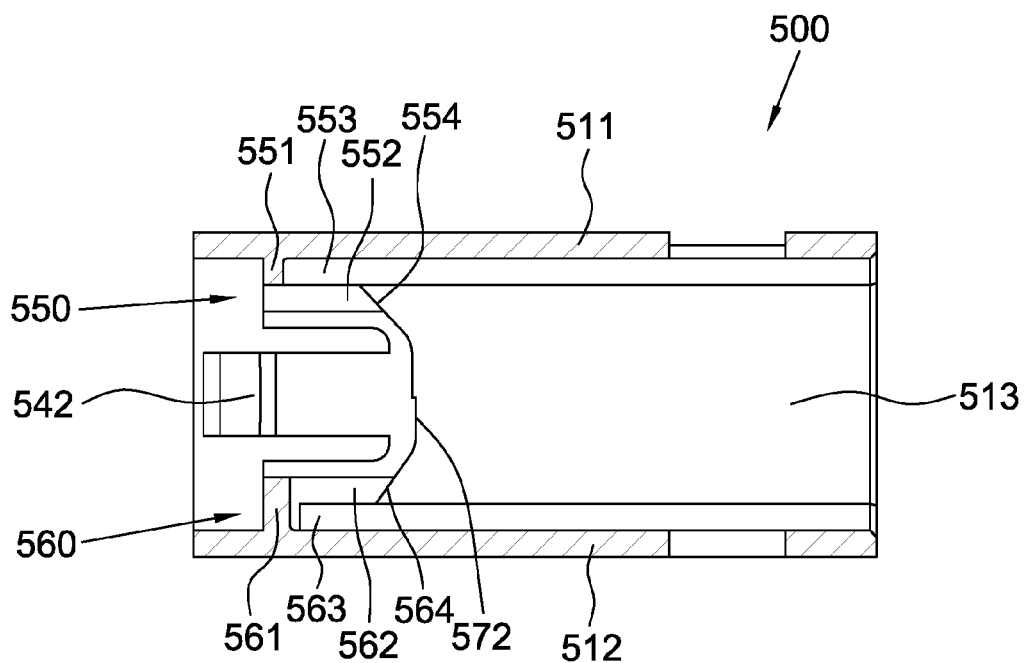
Figure 6G:
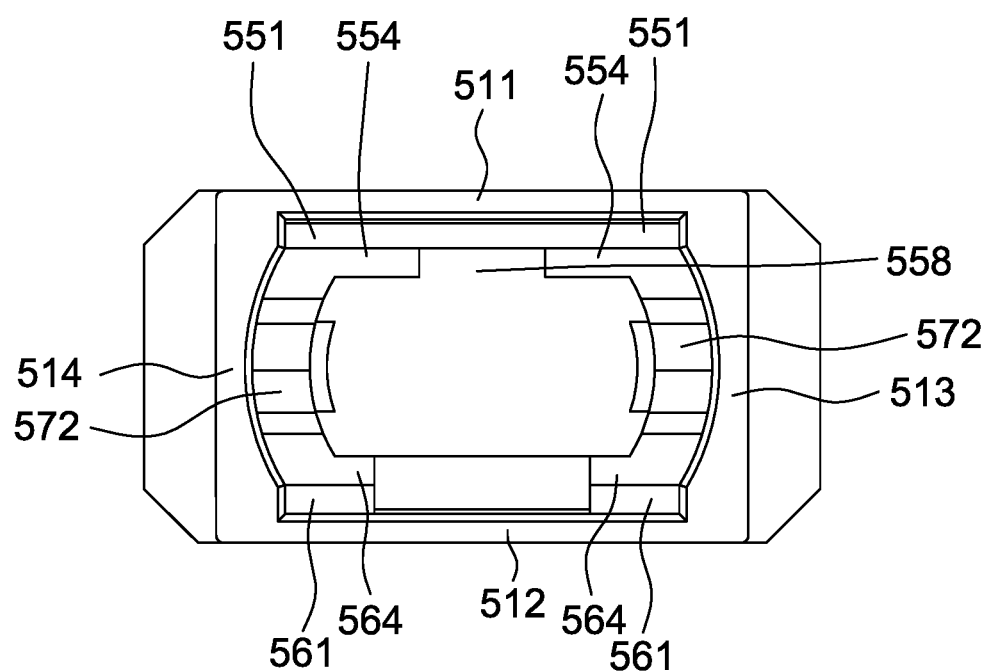
FIG. 6g is a front view of the main body of the optical fiber adapter of the present disclosure.
Figure 7A:
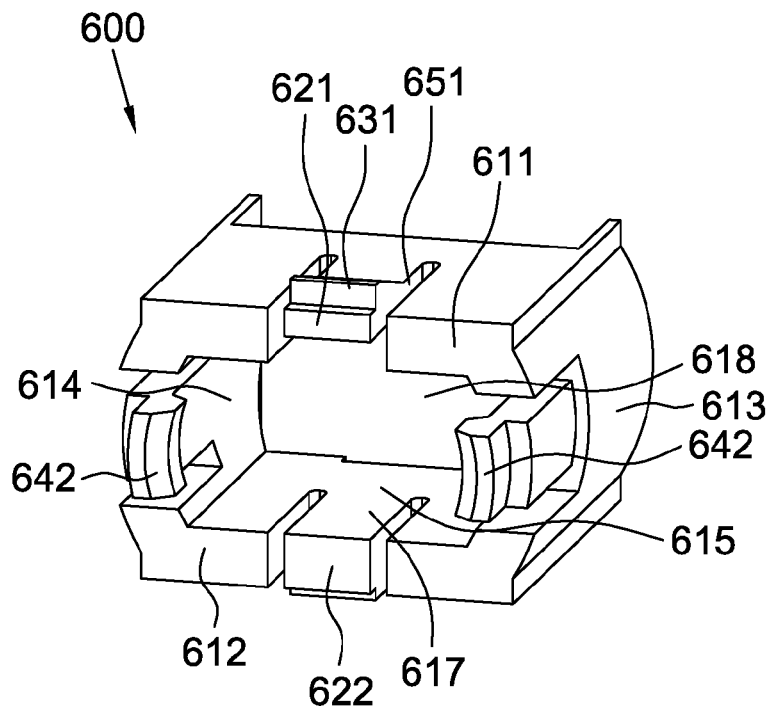
FIGS. 7a to 7d are different elevated perspective views of the inner housing of the optical fiber adapter of the present disclosure.
Figure 7B:
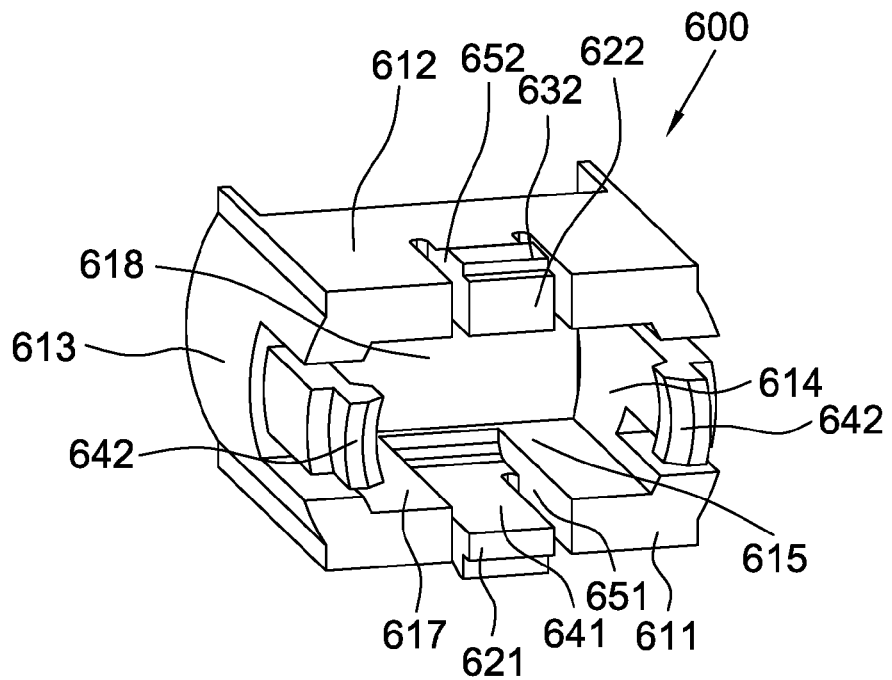
Figure 7C:
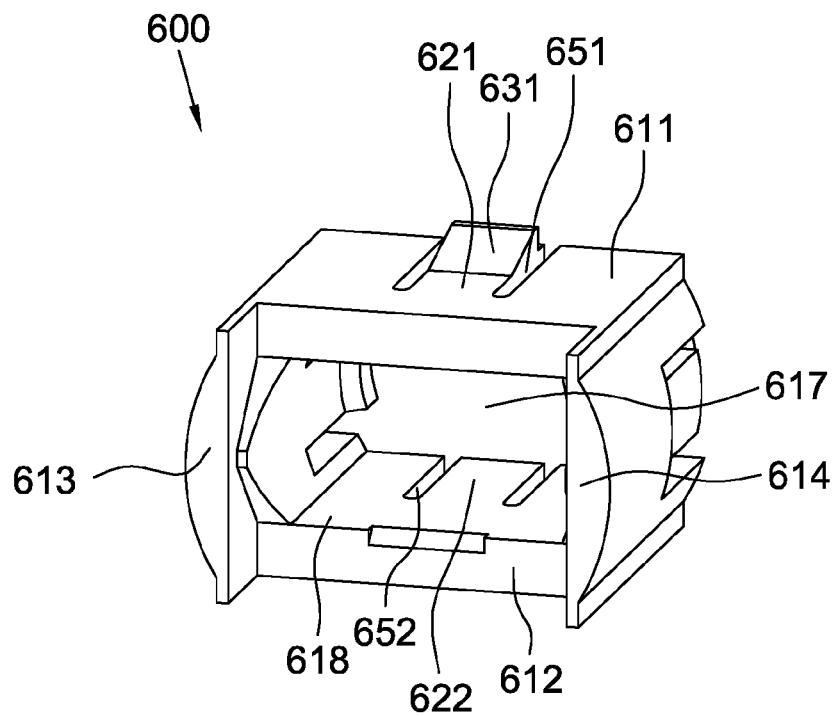
Figure 7D:
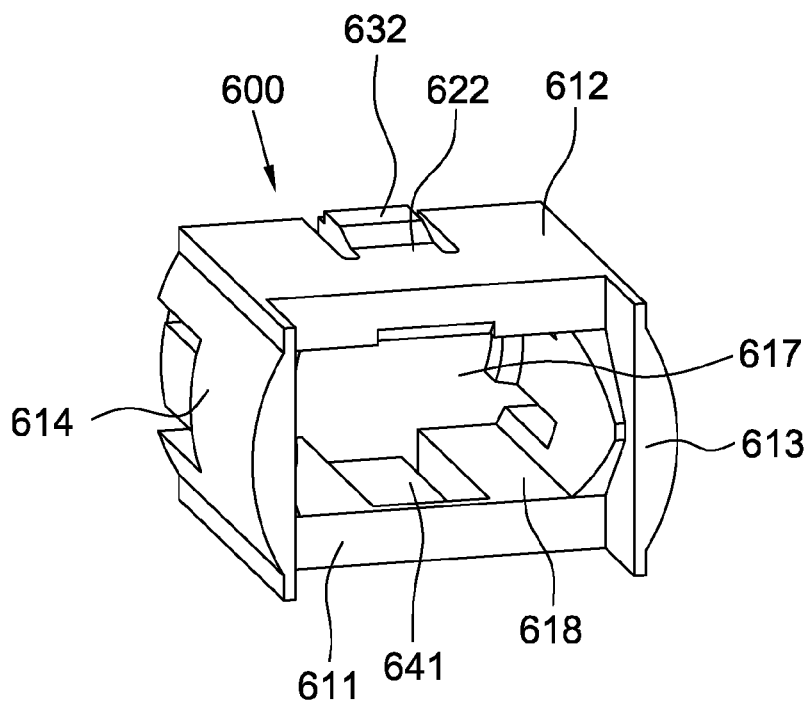
Figure 8A:
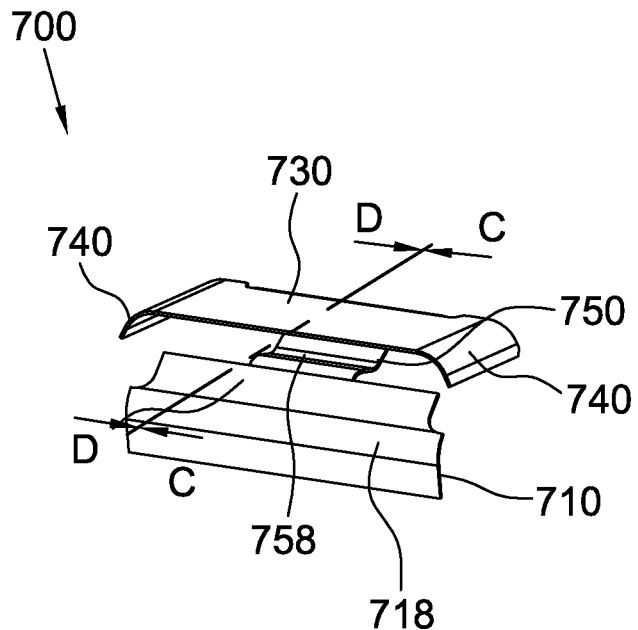
FIGS. 8a to 8c are different elevated perspective views of the first shutter member of the optical fiber adapter of the present disclosure.
Figure 8B:
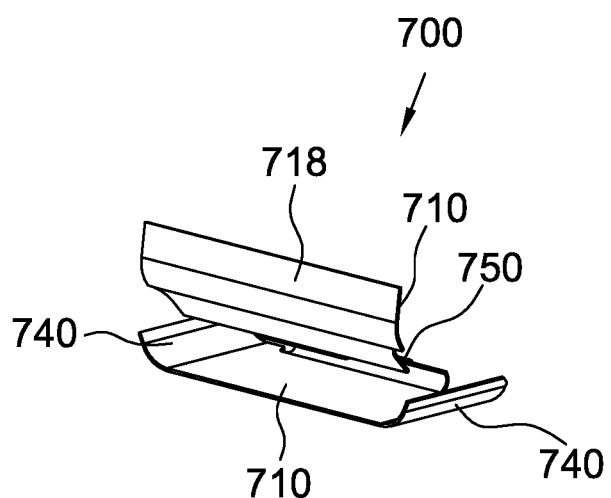
Figure 8C:
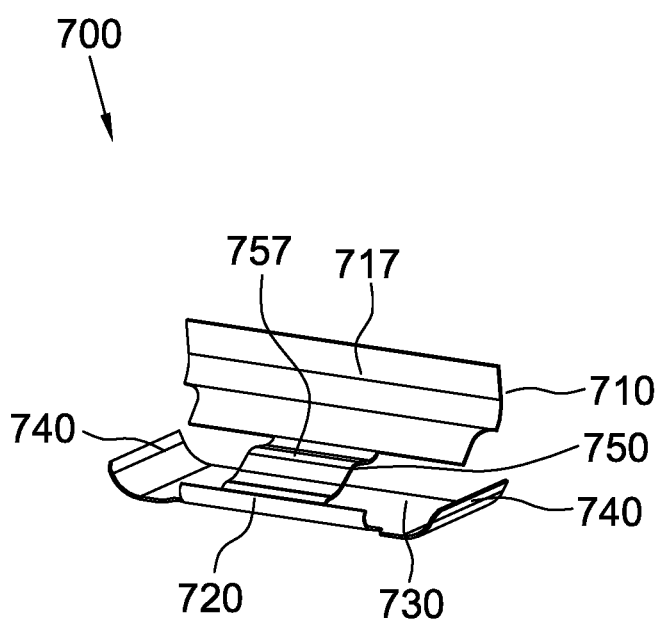
Figure 8D:
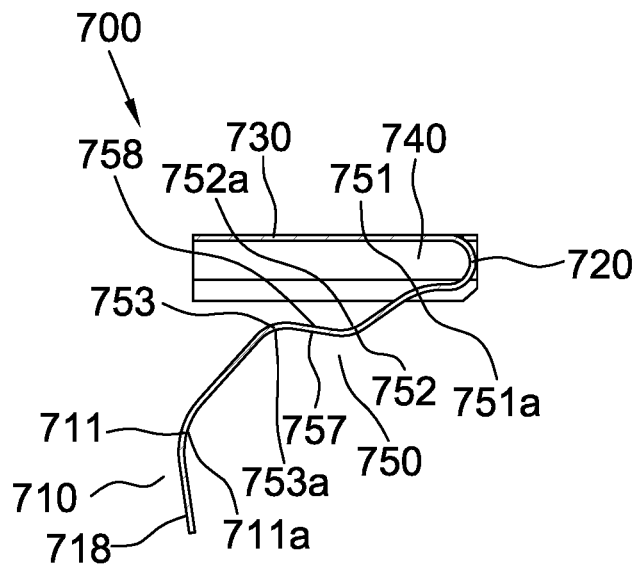
Figure 8E:
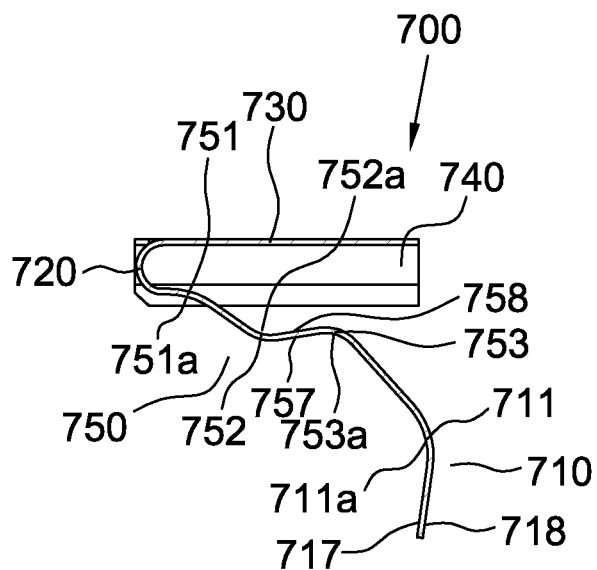
Figure 9A:
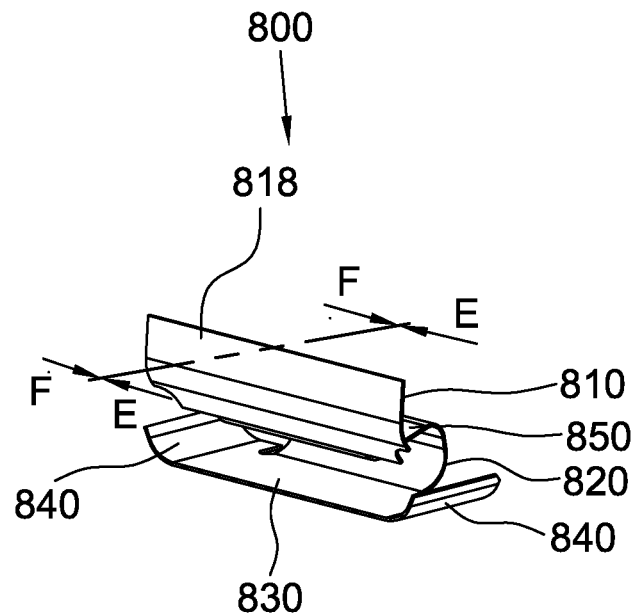
FIGS. 9a to 9d are different elevated perspective views of the second shutter member of the optical fiber adapter of the present disclosure.
Figure 9B:
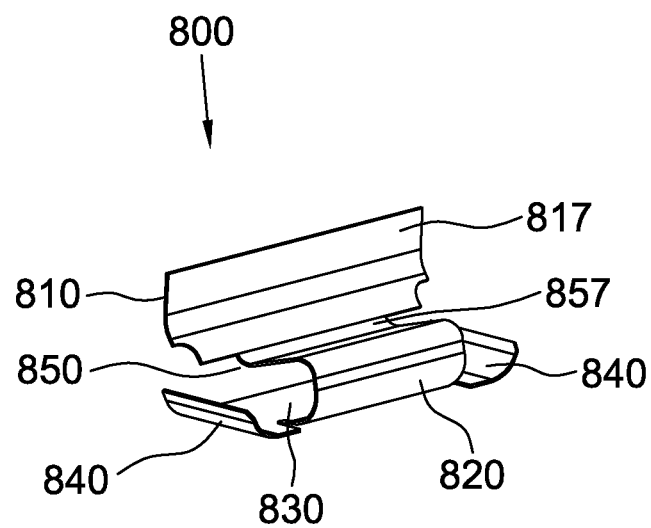
Figure 9C:
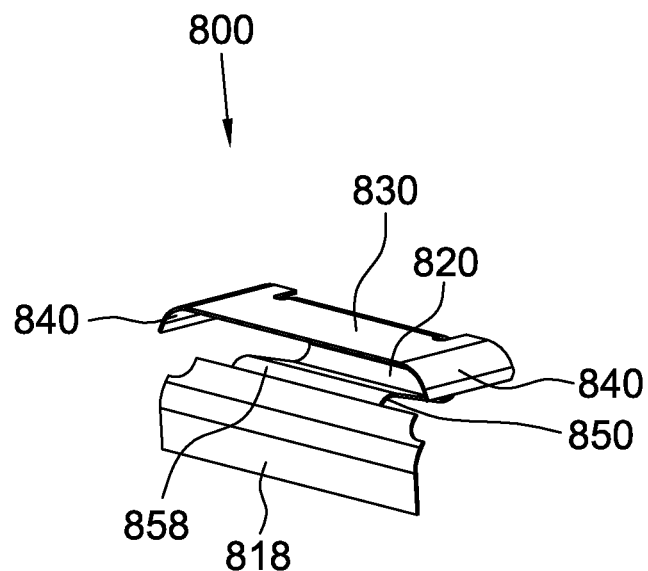
Figure 9D:
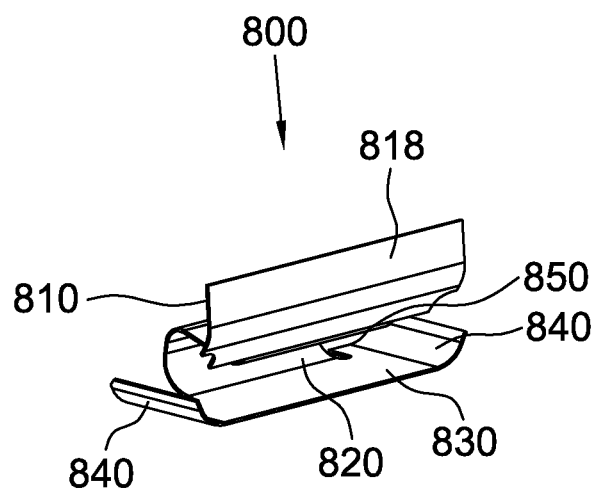
Figure 9E:
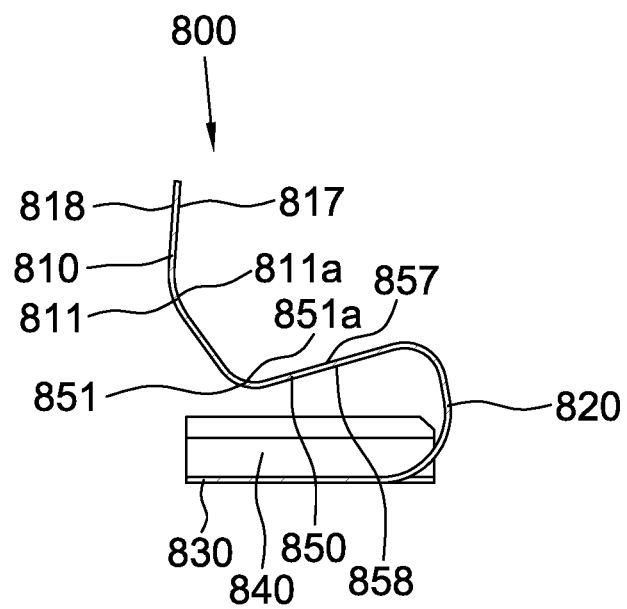
Figure 9F:
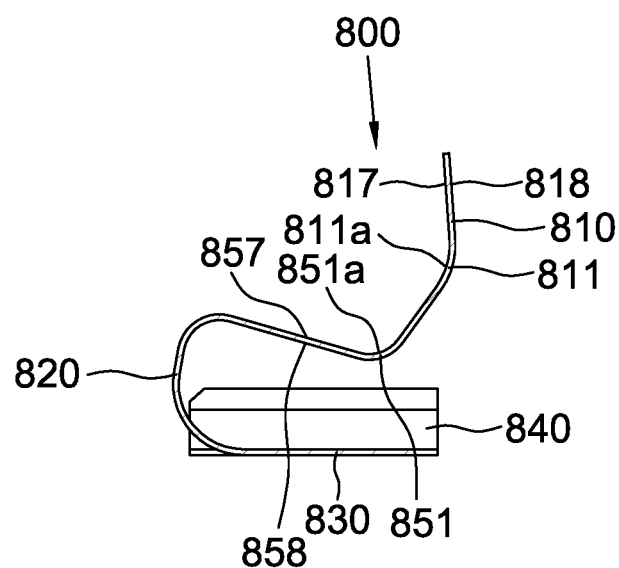

Reference is made to FIG. 5, the optical fiber adapter according to the present disclosure may be an MPO type optical fiber adapter and includes a main body 500, an inner housing 600, a first shutter member 700 and a second shutter member 800.

Reference is now made to FIGS. 6a to 6g, which illustrate the main body 500 of the present disclosure. The main body 500 may be constructed of plastics by an injection molding process. The main body 500 is hollow and substantially has a rectangular shape in cross section. The main body 500 has an accommodation room 515 defined by a top wall 511, a bottom wall 512, a right wall 513 and a left wall 514, wherein the top wall 511 faces the bottom wall 512 and connects with the right wall 513 and left wall 514. The accommodation room 515 has a first opening 517 and an opposed second opening 518 in a lengthwise or axial direction. The top wall 511 is formed with a rectangular opening 521 located near the first opening 517. Similarly, the bottom wall 512 is formed with a rectangular opening 522 located near the first opening 517. In one embodiment, the openings 521 and 522 are through holes. A hook 542 is formed at each of the right and left walls 513, 514. The two hooks 542 are positioned to face each other and extend in the axial direction toward the second opening 518. At least one stop block 550 is formed on the top wall 511 within the accommodation room 515 near the second opening 518. The stop block 550 includes a vertical portion 551 protruding transversely from the top wall 511 and a horizontal portion 552 protruding transversely from the vertical portion 551 toward the first opening 517. Therefore, the stop block 550 has an L-shaped cross section. A room 553 is defined between the stop block 550 and the top wall 511 accordingly. The room 553 has an opening facing the first opening 517. An inclined contact-surface 554 is formed on the rear end of the horizontal portion 552. The contact surface 554 is arranged to face the top wall 511 and the first opening 517. In one embodiment, there are two stop blocks 550 formed on the top wall 511, wherein one of the stop blocks 550 is located near the right wall 513 and the other stop block 550 is located near the left wall 514. The vertical portions 551 of the two stop blocks 550 may extend toward each other and connect together to form a continuous vertical portion 551. However, a break 558 is formed in the continuous vertical portion 551 and has a width slightly greater than that of the key projection 412 on the optical fiber connector 400a or 400b for the key projection 412 to pass therethrough when the optical fiber connector 400a or 400b is inserted into the accommodation room 515 from the second opening 518. Similarly, at least one stop block 560 is formed on the bottom wall 512 within the accommodation room 515 near the second opening 518. The stop block 560 includes a vertical portion 561 protruding transversely from the bottom wall 512 and a horizontal portion 562 protruding transversely from the vertical portion 561 toward the first opening 517. Therefore, the stop block 560 has an L-shaped cross section. A room 563 is defined between the stop block 560 and the bottom wall 512 accordingly. The room 563 has an opening facing the first opening 517. An inclined contact-surface 564 is formed on the rear end of the horizontal portion 562. The contact surface 564 is arranged to face the bottom wall 512 and the first opening 517. In one embodiment, there are two stop blocks 560 formed on the bottom wall 512, wherein one of the stop blocks 560 is located near the right wall 513 and the other stop block 560 is located near the left wall 514. The vertical portions 561 of the two stop blocks 560 may extend toward each other and connect together to form a continuous vertical portion 561. In addition, each of the right wall 513 and the left wall 514 is provided with a projection 570 formed thereon. The each projection 570 has an inclined contact-surface 572 formed on an outer surface thereof to face the first opening 517.

Reference is now made to FIGS. 7a to 7d, which illustrates the inner housing 600 of the present disclosure. The inner housing 600 may be constructed of plastics by an injection molding process. The inner housing 600 is hollow and substantially has a rectangular shape in cross section. The inner housing 600 has an accommodation room 615 defined by a top wall 611, a bottom wall 612, a right wall 613 and a left wall 614, wherein the top wall 611 faces the bottom wall 612 and connects with the right wall 613 and left wall 614. The accommodation room 615 has a third opening 617 and an opposed fourth opening 618 in the lengthwise or axial direction. A hook 642 is formed on each of the right and left walls 613, 614. The two hooks 642 are positioned to face each other and extend in the axial direction toward the third opening 617. The top wall 611 is formed with a slot extending in the axial direction and the slot defines a rectangular break 651. An arm 621 is formed within the break 651 and protrudes in the axial direction from the top wall 611 toward the third opening 617. The arm 621 has a root coupled to the top wall 611 accordingly. The bottom wall 612 is also formed with a slot extending in the axial direction and the slot defines a rectangular break 652. An arm 622 is formed within the break 652 and protrudes in the axial direction from the bottom wall 612 toward the third opening 617. The arm 622 has a root coupled to the bottom wall 612 accordingly. Engagement projections 631 and 632 are respectively formed on the arms 621 and 622 outside the accommodation room 615. The engagement projections 631 and 632 define respective angled or ramped outer surfaces that are sloped down toward the roots of the respective arms 621 and 622. A rectangular recess 641 extending in the axial direction is formed within the top wall 611 in the accommodation room 615. In one embodiment, the arm 621 defines a bottom of the recess 641. The recess 641 has a width slightly greater than that of the key projection 412 on the optical fiber connector 400a or 400b so as to receive the key projection 412 when the optical fiber connector 400a or 400b is inserted into the accommodation room 615 from the third opening 617.

Reference is now made to FIGS. 8a to 8e, which illustrates the first shutter member 700 of the present disclosure. The first shutter member 700 is elastic and integrally formed with a metal sheet. The first shutter member 700 includes a shutter plate 710, a connecting portion 720, a base portion 730, two flaps 740 and a supporting portion 750. The base portion 730 is generally rectangular and the connecting portion 720 extends out from the front side of the base portion 730. The two flaps 740 protrude transversely from the right side and left side of the base portion 730, respectively. The connecting portion 720 is substantially C-shaped in cross section and connects the base portion 730 with the supporting portion 750. In addition, the connecting portion 720 is sized such that it is lower than the continuous vertical portion 551 when the first shutter member 700 is inserted into the main body 500 and the base portion 730 is positioned on the top wall 511. The shutter plate 710 is curved and has opposing front surface 717 and back surface 718. The shutter plate 710 further has a bend 711 that defines a concave surface 711a on the front surface 717. The shutter plate 710 extends out from the supporting portion 750 at an angle of about 180 degrees. The shutter plate 710 may be pivotally moved about the connecting portion 720 toward the base portion 730. The shutter plate 710 is bent close to the base portion 730 with a push force exerting on the front surface 717 and quickly moves back to its an original position when the push force is withdrawn. The connecting portion 720 will deform when the shutter plate 710 is moved close to the base portion 730. The supporting portion 750 is wavy in cross section and has a uniform width. The supporting portion 750 has a side connecting with the shutter plate 710 and an opposed side connecting with the connecting portion 720. The supporting portion 750 has opposing front surface 757 and back surface 758, wherein the back surface 758 faces the base portion 730 and continuously extends to the back surface 718 of the shutter plate 710. The front surface 757 of the supporting portion 750 continuously extends to the front surface 717 of the shutter plate 710. The supporting portion 750 is narrower than both the shutter plate 710 and the connecting portion 720. The supporting portion 750 further has a first bend 751, a second bend 752 and a third bend 753, wherein the first bend 751 is located near to the connecting portion 720, the third bend 753 is located near to the shutter plate 753 and the second bend 752 is located between the first and third bends 751, 753. The first bend 751 defines a concave surface 751a on the front surface 757, the second bend 752 defines a concave surface 752a on the back surface 758 and the third bend 753 defines a concave surface 753a on the front surface 757 of the supporting portion 750. The supporting portion 750 extends away from the base portion 730 at the part from the first bend 751 to the second bend 752 and the part between the second and third bends 752, 753 are substantially parallel to the base portion 730.

Reference is now made to FIGS. 9a to 9f, which illustrates the second shutter member 800 of the present disclosure. The second shutter member 800 is elastic and integrally formed with a metal sheet. The second shutter member 800 includes a shutter plate 810, a connecting portion 820, a base portion 830, two flaps 840 and a supporting portion 850. The base portion 830 is generally rectangular and the connecting portion 820 extends out from the front side of the base portion 830. The two flaps 840 protrude transversely from the right side and left side of the base portion 830, respectively. The connecting portion 820 is substantially C-shaped in cross section and connects the base portion 830 with the supporting portion 850. In addition, the connecting portion 820 is sized such that it is higher than the continuous vertical portion 561 when the second shutter member 800 is inserted into the main body 500 and the base portion 830 is positioned on the bottom wall 512. The connecting portion 820 has a bending radius greater than that of the connecting portion 720. The shutter plate 810 is curved and has opposing front surface 817 and back surface 818. The shutter plate 810 further has a bend 811 that defines a concave surface 811a on the front surface 817. The shutter plate 810 extends out from the supporting portion 850 at an angle of about 180 degrees. The shutter plate 810 may be pivotally moved about the connecting portion 820 toward the base portion 830. The shutter plate 810 is bent close to the base portion 830 with a push force exerting on the front surface 817 and quickly moves back to its an original position when the push force is withdrawn. The connecting portion 820 will deform when the shutter plate 810 is moved close to the base portion 830. The supporting portion 850 has a uniform width and extends out from the connecting portion 820 at an angle of about 180 degrees. The supporting portion 850 has a side connecting with the shutter plate 810 and an opposed side connecting with the connecting portion 820. The supporting portion 850 has opposing front surface 857 and back surface 858, wherein the back surface 858 faces the base portion 830 and continuously extends to the back surface 818 of the shutter plate 810. The front surface 857 of the supporting portion 850 continuously extends to the front surface 817 of the shutter plate 810. The supporting portion 850 is generally rectangular and extends out from the connecting portion 820 toward the base portion 810. The supporting portion 850 is equally wide to the connecting portion 820 but narrower than the shutter plate 810. A bend 851 is formed at the rear side of the supporting portion 850 and defines a concave surface 851a on the front surface 857 of the supporting portion 850.

Figure 10:
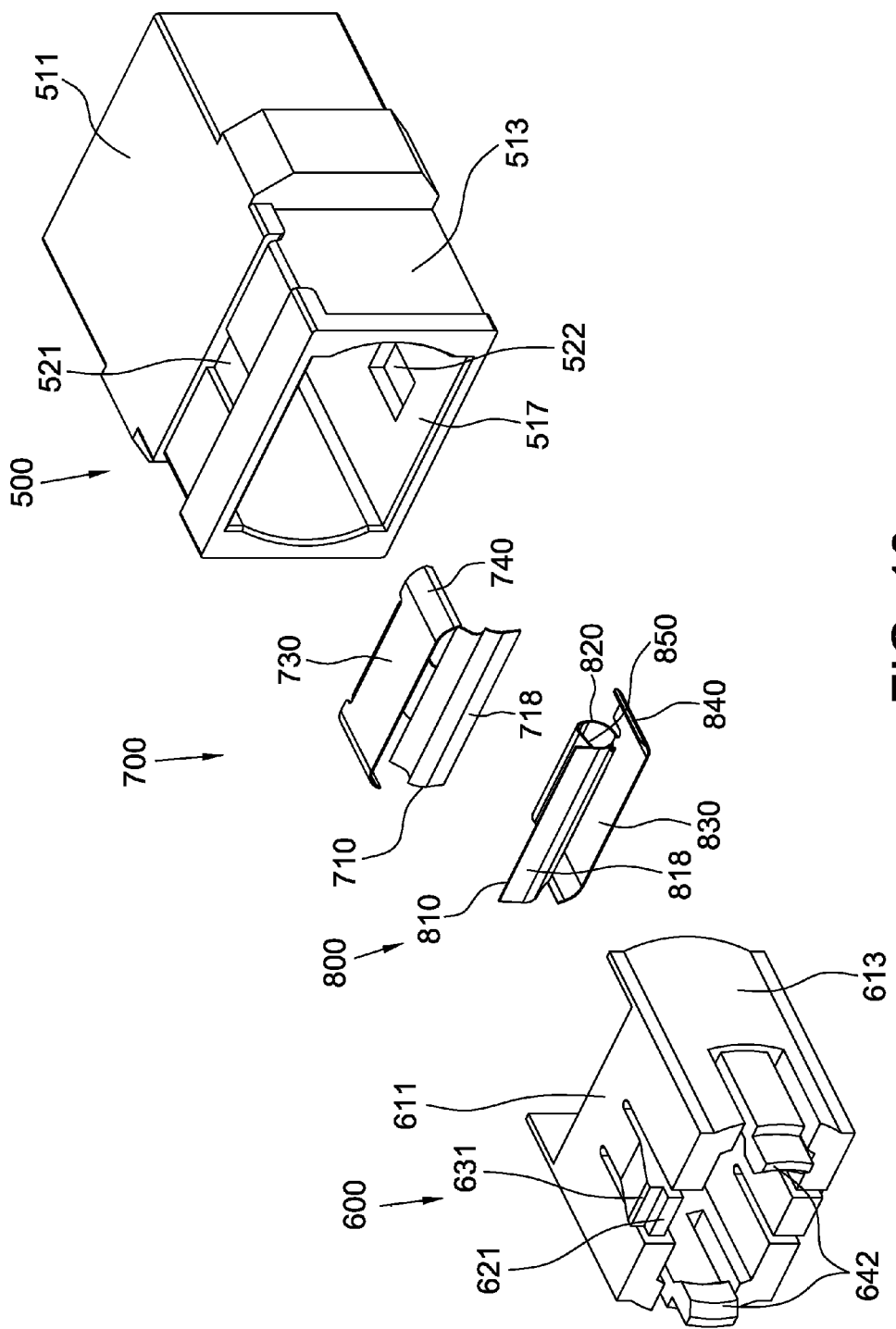
FIG. 10 illustrates how to assemble the optical fiber adapter of the present disclosure.

Reference is made to FIG. 10, when preparing to assemble the optical fiber adapter of the present disclosure, the first shutter member 700 is first inserted into the main body 500 from the first opening 517 in such a manner that the connecting portion 720 is headed and moved toward the stop block 550. After the connecting portion 720 has come close to the vertical portion 551, the base portion 730 will position on the top wall 511 of the main body 500 and the front surface 717 of the shutter plate 710 will face the second opening 518. At this state the shutter plate 710 extends toward the bottom wall 512 and the connecting portion 720 is lower than the continuous vertical portion 551. Furthermore, the two flaps 740 respectively press upon the right wall 513 and left wall 514 of the main body 500. After the first shutter member 700 has come in position within the main body 500, the second shutter member 800 is then inserted into the main body 500 from the first opening 517 in such a manner that the connecting portion 820 is headed and moved toward the stop block 560. After the connecting portion 820 has come close to the vertical portion 561, the base portion 830 will position on the bottom wall 512 of the main body 500 and the front surface 817 of the shutter plate 810 will face the second opening 518 and press upon the shutter plate 710 of the first shutter member 700 at the rear section of the back surface 718. At this state the shutter plate 810 extends toward the top wall 511 and the connecting portion 820 is higher than the continuous vertical portion 561. Furthermore, the two flaps 840 respectively press upon the right wall 513 and left wall 514 of the main body 500.

Figure 11:
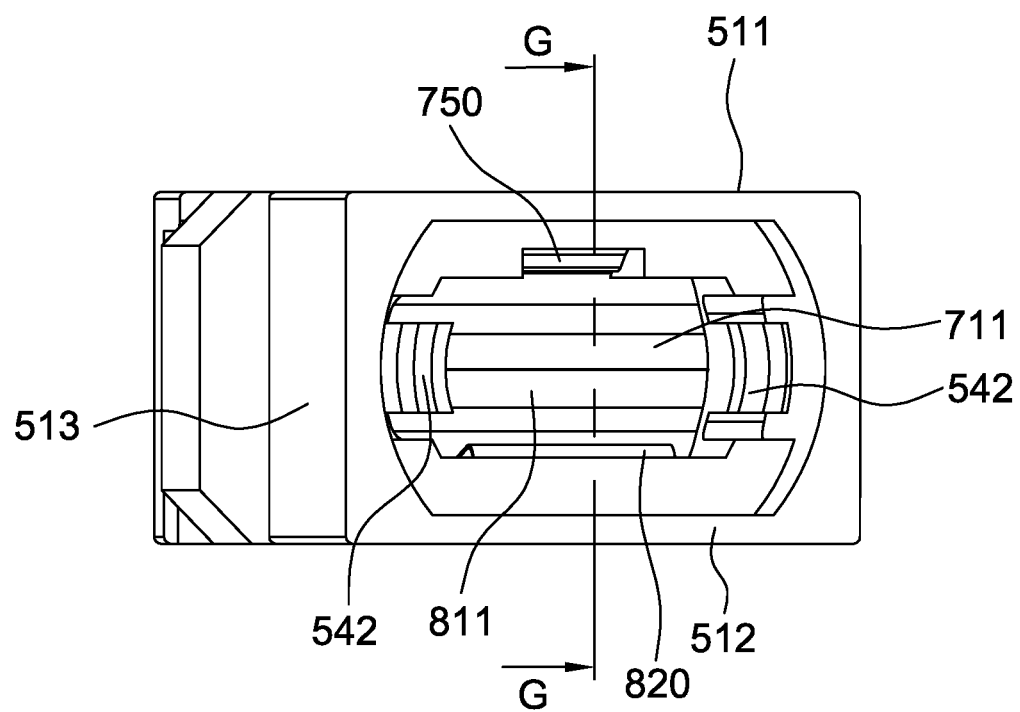
FIG. 11 is an elevated perspective view of the optical fiber adapter of the present disclosure.
Figure 12:
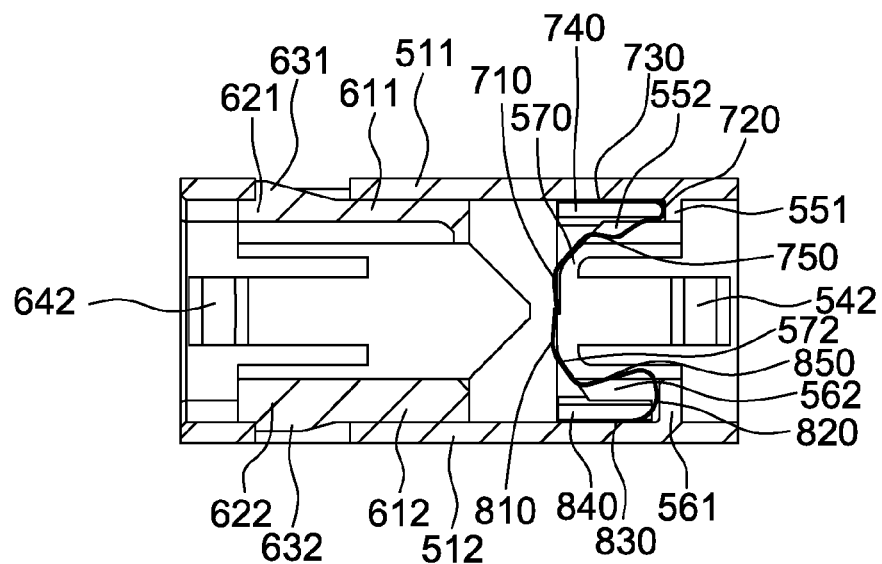
FIG. 12 is a cross-sectional view taken along line G-G of FIG. 11.

Finally, the inner housing 600 is inserted into the main body 500 from the first opening 517 with the hooks 642 thereof being positioned backward to the second opening 518 of the main body 500. In the optical fiber adapter of the present disclosure the inner housing 600 may be inserted into the main body 500 such that the top wall 611 and bottom wall 612 of the inner housing 600 come to being positioned to directly face the top wall 511 and bottom wall 512 of the main body 500 respectively. Alternatively, the top wall 611 and the bottom wall 612 may be positioned to directly face the bottom wall 512 and top wall 511 of the main body 500 respectively. In the assembling method illustrated in FIG. 10, the top wall 611 and bottom wall 612 of the inner housing 600 will directly face the top wall 511 and bottom wall 512 of the main body 500 respectively when the inner housing 600 has been inserted into the main body 500. When the inner housing 600 is pushed into the main body 500, the engagement projections 631 and 632 will slide on the top and bottom walls 511, 512 respectively and therefore bend the arms 621 and 622. When the inner housing 600 continues to be pushed into the main body 500 such that the engagement projections 631, 632 fall into the openings 521, 522 respectively, the arms 621 and 622 spring up and the assembling of the optical fiber adapter of the present disclosure is finished. At this state the rear sides of the right wall 613 and left wall 614 of the inner housing 600 respectively press upon the rear sides of the two flaps 740 of the first shutter member 700 and the rear sides of the two flaps 840 of the second shutter member 800 to push the connecting portions 720 and 820 further toward the stop blocks 550 and 560 respectively. FIGS. 11 and 12 illustrate the assembled optical fiber adapter of the present disclosure.

Figure 13:
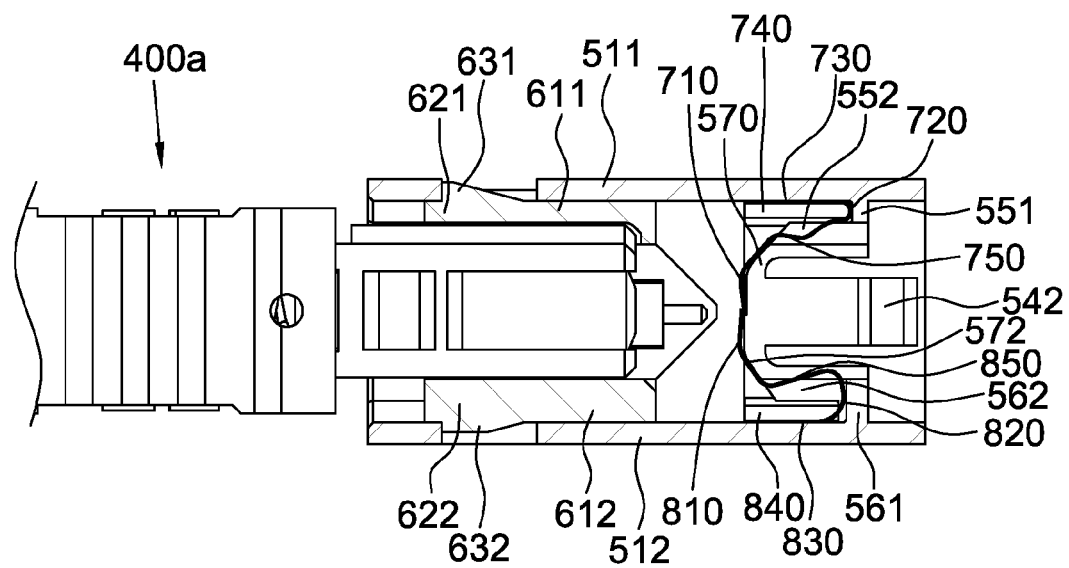
FIG. 13 illustrates the operation principles of the first and second shutter members of the optical fiber adapter of the present disclosure.

Reference is made to FIG. 13, when no one optical fiber connector is inserted into the main body 500 from the second opening 518, the shutter plates 710 of the first shutter member 700 and the shutter plate 810 of the second shutter member 800 will spring up as a result of elasticity. When an optical fiber connector 400a of FIG. 4a is inserted into the inner housing 600 from the third opening 617, the light beams emitting out from the optical fibers 430 of the optical fiber connector 400a will be obstructed by the shutter plates 710 and 810. Consequently, the occurrence of exposure to the harmful light beams may be avoided. In addition, the edges of the shutter plates 710, 810 come in contact with the contact surfaces 572 of the projections 570 on the right and left walls 513, 514 of the main body 500. The inclined contact surfaces 554, 564 on the horizontal portions 552, 562 of the main body 500 are in respective contact with the front surfaces 717, 817 of the shutter plates 710, 810. This further prevents the inserted optical fiber connector 400a from contamination that has come from the second opening 518 into the main body 500.

Reference is made to FIGS. 14 and 15, an optical fiber connector 400b of FIG. 4b may be inserted into the main body 500 from the second opening 518 such that its key projection 412 is passed through the break 558 in the continuous vertical portion 551 of the stop blocks 550 and the gap between the two horizontal portions 552. Since the connecting portion 720 is lower than the continuous vertical portion 551 and the connecting portion 820 is higher than the continuous vertical portion 561, the inserted optical fiber connector 400b will come in first contact with the connecting portion 820. The connecting portion 820 deforms and therefore drives the supporting portion 850 to move. The moving supporting portion 850 then drives the shutter plate 810 to swing toward the bottom wall 512 of the main body 500. When the optical fiber connector 400b continues to be pushed into the main body 500, its key projection 412 then comes in contact with the supporting portion 750 of the first shutter member 700. The pushed supporting portion 750 drives the shutter plate 710 to swing toward the top wall 511 of the main body 500. When the optical fiber connector 400b is pushed further into the main body 500, the key projection 412 comes in direct contact with the second bend 752 of the supporting portion 750 to move the shutter plate 710 further toward the top wall 511. It is appreciated that the inserted optical fiber connector 400b is still in contact with the connecting portion 820 when it starts to push the supporting portion 750. When the optical fiber connector 400b is still further pushed into the main body 500, it comes in direct contact with both the shutter plates 710, 810 to push their end sections to being closer to the top and bottom walls 511 and 512 respectively.

When the optical fiber connector 400b is fully inserted into the main body 500, the hooks 542 of the main body 500 respectively hook on to the recesses 414 on the optical fiber connector 400b. The guide pins 440 of the optical fiber connector 400a are respectively inserted into the guide holes 450 on the optical fiber connector 400b and the optical fibers 430 exposed out from the optical fiber connector 400a and 400b come in direct contact with each other so that the light beam coming from one fiber may be optically coupled to the coupled fiber. When the optical fiber connectors 400a and 400b come in optical contact with each other, the shutter plate 710 and the supporting portion 750 are pushed to being positioned between the top wall 511 of the main body 500 and the optical fiber connector 400b, and the shutter plate 810 and the supporting portion 850 are pushed to being positioned between the bottom wall 512 and the optical fiber connector 400b. Upon pulling out the optical fiber connector 400b from the main body 500, the pressed shutter plates 710, 810 will quickly spring up to respective original positions as a result of elasticity to obstruct the emitting light beams from the optical fibers 430 of the optical fiber connector 400a again. Consequently, the occurrence of exposure to the harmful light beams may be avoided.

In the optical fiber adapter of the present disclosure the engagement projections 631, 632 of the inner housing 600 respectively fall into the openings 521, 522 on the top and bottom walls 511 and 512 to prevent the inner housing 600 from being pulled out of the main body 500 from the first opening 517. The recess 641 of the inner housing 600 is configured to receive the key projection 412 of the optical fiber connector 400a or 400b so that the optical fiber connector 400a, 400b may be inserted into the inner housing 600 with only the predetermined orientation. The coupling polarity of the optical fiber connectors 400a and 400b may be switched by positioning the top and bottom walls 611, 612 of the inner housing 600 to respectively face the top and bottom walls 511, 512 or to respectively face the bottom and top walls 512, 511 of the main body 500 when placing the inner housing 600 within the main body 500. The hooks 542, 642 of the main body 500 and inner housing 600 are configured to hook on to the recesses 414 on the optical fiber connector 400a or 400b.

Referring to FIGS. 14 and 15 again, there is no need to detach the first and second shutter members 700, 800 from the main body 500 prior to inserting an optical fiber connector 400b into the main body 500 from the second opening 518. When the optical fiber connector 400b is inserted into the main body 500 from the second opening 518, the shutter plates 710, 810 are pushed to being close to the top and bottom walls 511, 512 of the main body 500, respectively. Upon pulling out the optical fiber connector 400b from the main body 500, the pressed shutter plates 710, 810 will quickly spring up to respective original positions as a result of elasticity. Accordingly, the light beams emitting from the optical fibers 430 of the optical fiber connector 400a may be obstructed again.

In the optical fiber adapter of the present disclosure the flaps 740, 840 of the shutter members 700, 800 are positioned within the main body 500 to press upon the right wall 513 and the left wall 514 so that the transverse movements of the shutter members 700, 800 in the accommodation room 515 of the main body 500 may be restricted. The gap between the two horizontal portions 552 of the main body 500 is larger than the width of the supporting portion 750 of the first shutter member 700 to avoid interfering with the swing of the supporting portion 750. Similarly, the gap between the two horizontal portions 562 of the main body 500 is larger than both the widths of the connecting portion 820 and supporting portion 850 of the second shutter member 800 to avoid interfering with their swing. The inclined contact surfaces 554, 564 on the horizontal portions 552, 562 of the main body 500 are configured to be in respective contact with the front surfaces 717, 817 of the shutter plates 710, 810 to prevent the shutter plates 710, 810 from further swing toward the second opening 518. Furthermore, the first and second shutter members 700, 800 may be designed such that the shutter plate 810 is driven to swing earlier than the shutter plate 710 by an optical fiber connector inserted from the second opening 518 into the main body 500. This may prevent the shutter plates 710 and 810 from interfering with each other.

Besides, when the openings 521, 522 are through holes, elongated objects may be used through the openings 521, 522 to press down the arms 621, 622. This way the inner housing 600 and shutter members 700, 800 may be taken out from the main body 500 through the first opening 517. The stop blocks 550, 560 of the main body 550 are positioned to restrict the further movements of the connecting portions 720, 820 of the shutter members 700, 800 respectively so that the shutter members 700, 800 are not able to be pulled out from the second opening 518.

Although the present disclose has been explained in detailed with MPO type optical fiber adapter, it will be appreciated that the optical fiber adapter of the present disclosure may include other types of optical fiber adapters.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter for optically coupling two optical fiber connectors with each other, the optical fiber adapter comprising:
 a main body having an accommodation room defined by a first wall, a second wall, a third wall and a fourth wall, the first wall facing the third wall and connecting with the second and fourth walls, wherein the accommodation room has opposing first and second openings in an axial direction, the second opening is configured to allow a first optical fiber connector to insert into the accommodation room;
 an elastic first shutter member positioned within the accommodation room, the first shutter member comprising:
  a first base portion positioned on the first wall;
  a first supporting portion;
  a first connecting portion connecting the first base portion with the first supporting portion; and
  a first shutter plate extending from the first supporting portion toward the third wall, wherein the first supporting portion is configured to drive the first shutter plate to move;
 an elastic second shutter member positioned within the accommodation room, the second shutter member comprising:
  a second base portion positioned on the third wall;
  a second supporting portion;
  a second connecting portion connecting the second base portion with the second supporting portion; and
  a second shutter plate extending from the second supporting portion toward the first wall, wherein the second supporting portion is configured to drive the second shutter plate to move; and
 an inner housing positioned within the accommodation room of the main body, the inner housing having an accommodation room defined by a fifth wall, a sixth wall, a seventh wall and an eighth wall, the fifth wall facing the first and seventh walls and connecting with the sixth and eighth walls, wherein the accommodation room of the inner housing has opposing third and fourth openings in the axial direction, the third opening is configured to allow a second optical fiber connector to insert into the accommodation room of the inner housing,
 wherein the insertion of the first optical fiber connector from the second opening causes the first and second shutter plates to swing toward the first and third walls respectively.

2. The optical fiber adapter as claimed in claim 1, wherein the second connecting portion is substantially C-shaped in cross section and is configured to be in direct contact with the first optical fiber connector when the first optical fiber connector is inserted into the accommodation room of the main body from the second opening.

3. The optical fiber adapter as claimed in claim 2, wherein the first connecting portion is substantially C-shaped in cross section and is sized not to be in direct contact with the first optical fiber connector when the first optical fiber connector is inserted into the accommodation room of the main body from the second opening.

4. The optical fiber adapter as claimed in claim 1, further comprising:
 two stop blocks coupled to the main body to respectively restrict the further movements of the first and second connecting portions toward the second opening.

5. The optical fiber adapter as claimed in claim 1, wherein the first shutter member further comprising:
 two first flaps extending transversely from the first base portion to respectively press upon the second and fourth walls.

6. The optical fiber adapter as claimed in claim 5, wherein the sixth and eighth walls are configured to respectively push the two first flaps toward the second opening.

7. The optical fiber adapter as claimed in claim 5, wherein the second shutter member further comprising:
 two second flaps extending transversely from the second base portion to respectively press upon the second and fourth walls.

8. The optical fiber adapter as claimed in claim 7, wherein the sixth and eighth walls are further configured to respectively push the two second flaps toward the second opening.

9. The optical fiber adapter as claimed in claim 5, wherein the second supporting portion extends out from the second connecting portion toward the second base portion.

10. The optical fiber adapter as claimed in claim 9, wherein a bend is provided at a rear side of the second supporting portion, the second shutter plate extends out from the bend toward the first wall.

11. The optical fiber adapter as claimed in claim 3, wherein a bend is provided on the first supporting portion, the bend is configured to be in direct contact with the first optical fiber connector when the first optical fiber connector is inserted into the accommodation room of the main body from the second opening.

12. The optical fiber adapter as claimed in claim 3, further comprising:
 a stop block coupled to the first wall of the main body to restrict the further movement of the first connecting portion toward the second opening, wherein a break is formed in the stop block for a key projection formed on the first optical fiber connector to pass therethrough.

13. The optical fiber adapter as claimed in claim 1, wherein a fifth opening is formed within the first wall or the third wall, the inner housing further comprising:
 an arm; and
 an engagement projection coupled to the arm, wherein the engagement projection is positioned in the fifth opening.

14. The optical fiber adapter as claimed in claim 1, wherein the main body further comprising:
 two projections respectively formed on the second and fourth walls, the each projection having a contact surface facing the first opening, the two contact surfaces are configured to be in contact with the first and second shutter plates.

15. The optical fiber adapter as claimed in claim 1, wherein the optical fiber adapter is MPO type.

* * * * *